(12) United States Patent
Houllier et al.

(10) Patent No.: US 8,760,473 B2
(45) Date of Patent: Jun. 24, 2014

(54) MAP DISPLAY METHOD

(75) Inventors: Jean-Roch Houllier, Velizy (FR); Alain Brethereau, Velizy (FR); Béatrix De Mathan, Velizy (FR)

(73) Assignee: Alcatel Lucent, Paris (FR)

( * ) Notice: Subject to any disclaimer, the term of this patent is extended or adjusted under 35 U.S.C. 154(b) by 1258 days.

(21) Appl. No.: 12/591,251

(22) Filed: Nov. 13, 2009

(65) Prior Publication Data

US 2010/0182342 A1 Jul. 22, 2010

(30) Foreign Application Priority Data

Jan. 20, 2009 (FR) ...................................... 09 50328

(51) Int. Cl.
*G09G 5/00* (2006.01)

(52) U.S. Cl.
USPC ........... 345/647; 345/672; 345/671; 345/654; 345/472; 345/428; 345/660; 345/663; 345/665; 345/661

(58) Field of Classification Search
USPC ................ 345/672, 671, 472, 661, 654, 428; 358/453, 451, 450; 382/298; 473/566
See application file for complete search history.

(56) References Cited

U.S. PATENT DOCUMENTS

| | | | | |
|---|---|---|---|---|
| 5,555,354 A * | 9/1996 | Strasnick et al. | ............. | 345/427 |
| 5,902,347 A * | 5/1999 | Backman et al. | ............. | 701/455 |
| 6,169,552 B1 * | 1/2001 | Endo et al. | ..................... | 345/427 |
| 6,392,661 B1 * | 5/2002 | Tankersley | .................... | 345/660 |
| 2005/0134610 A1 * | 6/2005 | Doyle et al. | .................. | 345/647 |
| 2006/0082901 A1 * | 4/2006 | Shoemaker | ................... | 359/692 |
| 2007/0064018 A1 * | 3/2007 | Shoemaker et al. | .......... | 345/660 |

OTHER PUBLICATIONS

M.S.T. Carpendale et al., "A Framework for Unifying Presentation Space" UIST 01. Proceedings of the 14$^{th}$ Annual ACM Symposium on User Interface Software and Technology, Orlando, FL. Nov. 11-14, 2001, pp. 61-70.

Y.K. Leung et al., "A Review and Taxonomy of Distortion-Oriented Presentation Techniques" ACM Transaction on Computer-Human Interaction, Vo. 1, No. 2, Jun. 1, 1994, pp. 126-160.

T. Alan Keahey et al., "Techniques for Non-Linear Magnification Transformations" Information Visualization '96, Proceedings of the IEEE Symposium on San Francisco, CA, Oct. 28-29, 1993, pp. 38-45.

Hongzhi Song et al., "LensList: Browsing and Navigating Long Linear Information Structures," Human Interface and the Management of Information. Methods, Techniques and Tools in Information Design, vol. 4557/2007, Springer Berlin / Heidelberg, 2007, 535-543.

\* cited by examiner

*Primary Examiner* — Abderrahim Merouan
(74) *Attorney, Agent, or Firm* — Harness, Dickey & Pierce

(57) ABSTRACT

This method is an improvement to a method used to enlarge the display of a first portion of a map, without hiding a first peripheral portion of this map. This improvement involves detecting an event which appears in said first peripheral portion (SPP4'). The improvement further involves defining a second portion to be enlarged (SPA5), centered on the position (BS2) of this event, defining a second peripheral zone (SPP5) associated with this second portion to be enlarged, displaying (SPA5') the second portion to be enlarged (SPA5) by applying respective enlargement ratios greater than 100% to at least some elements of that portion, so as to make the event more legible, and displaying (SPP5') the second peripheral portion (SPP5) by applying at least to some elements of this portion respective enlargement ratios lower than 100% so as to save surface area to avoid hiding a portion of the map.

6 Claims, 9 Drawing Sheets

FIG_5

FIG_6

FIG_7

FIG_8

FIG_10

FIG_11

FIG12

FIG_13

FIG_14

FIG_15

FIG_16

MAP DISPLAY METHOD

CROSS-REFERENCE TO RELATED APPLICATIONS

This application claims priority under 35 U.S.C. §119 to French application no. 0950328 filed on Jan. 20, 2009, the entire contents of which is hereby incorporated herein by reference.

BACKGROUND OF THE INVENTION

1. Field of the Invention

The invention concerns a map display method which can be used in a geographic information system (GIS), or similar system, for example a telecommunication network optimization graphical system. A GIS is a computer tool used to organize and present spatially referenced alphanumerical data, as well as to produce drawings and maps.

2. Description of Related Art

The role of a geographic information system is to propose a more or less realistic representation based on graphic primitives such as points, vectors (arcs), polygons or grids (also known as rasters). Associated with these primitives are attribute information such as the nature of the primitive (road, railway, forest, etc.) or any other contextual information (number of inhabitants, type or surface area of a commune for example).

A geographic information system is used to handle databases for flat or three-dimensional geographic data. A geographic table consists of a traditional table (comprising tabular fields of the type string, number, Boolean, date), which is however enhanced with a specific "geographic object" field containing the value of a geo-positioned geographic object (in practice, it is a data structure comprising the type of object and the list of its X, Y and if applicable Z coordinates). Three main types of geographic objects are handled: points, polylines (pecked lines) or polygons.

The three types of objects handled each have their benefits for modeling reality and representing real objects: a point can represent a tree, an inhabitant, a site; a polyline can represent a circulation path (sewer, street, road, motorway, railway, etc.) or any kind of transmission line (high-voltage cable, pipeline). Polygons, meanwhile, can be used to mark specific regions and zones (boundaries of administrative communes, park, suburb, business park, etc.). A geographic information system is therefore used to represent the existing geographic infrastructures and environment: communes, streets, departements, regions, or even mountain ranges (in the form of datum lines).

Specific analysis features also allow classifications to be produced on a table, and objects to be automatically assigned a specific graphic display format depending on the classification values. The data associated with the objects present in the tables displayed can be read when required, by clicking on the object which appears on the map.

There are two possible representation methods:
vectorial (vector format): objects are represented by points, lines, polygons or polygons with holes;
bitmap (raster format): this is a digitized image, drawing or photo displayed in the GIS as an image.

A system of geographic coordinates (spherical or projective) is used to reference the objects in space and position all of the objects in relation to the others. The objects are generally arranged in layers, each layer combining all homogeneous objects (building, rivers, road system, parcels, etc.).

A geographic information system is also used to represent the infrastructure data specific to a given sector. For example, a telecommunications operator may show its sites and its fiber optic links, or show mobile telephony base stations, with their coverage areas. Displaying this information in the form of a map allows the operator to understand more easily the state of the network, and therefore to manage the network to optimize the use of resources and the quality of the service.

A geographic information system offers the user a whole range of display management functions: the zoom and horizontal scroll functions are traditionally present on all geographic information systems. It is known to produce a zoom function which replaces the current image of a map with another image with the same surface area but showing a smaller (to see in greater detail) or larger (to see a larger region) land surface, depending on the choice of the user. This is the equivalent of changing the scale of the whole map displayed.

It is also known to carry out a local zoom (also known as a magnifying function) which enlarges a portion of the map displayed by displaying this portion, with a constant enlargement, above the initial image of the map, centering it over the portion to be enlarged. This method has the disadvantage of hiding a portion of the initial image of the map, the hidden surface being larger than the surface occupied by the portion to be enlarged in the initial image. For example, if the portion to be enlarged is circular and if the enlargement is +100% (on both the x and y axes), a circular image is embedded into the initial image with a radius twice that of the portion to be enlarged. As a result, the hidden surface is four times larger than the surface of the portion to be enlarged. There is therefore, around the portion which is being zoomed, a crown which is totally invisible and with a surface three times larger than the initial surface of the portion to be enlarged. This hiding of the peripheral zone can be very problematic. Furthermore, the sudden change of scale at the boundary of the enlarged portion creates a discontinuity which is highly prejudicial to the intelligibility of the objects shown.

It is known to resolve this hiding problem and this discontinuity problem through a nonlinear display method.

The thesis of T. Alan Keahey, Nonlinear Magnification, PhD thesis, Department of Computer Science, Indiana University, December 1997, describes different nonlinear display methods used to locally carry out a zoom enlarging a portion of a map, without hiding anything on the periphery of this portion, thanks to the fact that a zone located at the periphery of this portion to be enlarged is reduced, such that it compensates for the increased display surface of the portion to be enlarged.

This document also shows that such a display method can be controlled dynamically by geographic data, for example to enlarge a portion of a map showing road traffic, in order to highlight a road on which traffic measures have revealed the formation of a traffic jam, or to enlarge several portions of the same map showing air traffic, in order to highlight portions where air traffic is particularly heavy.

Figure 1:
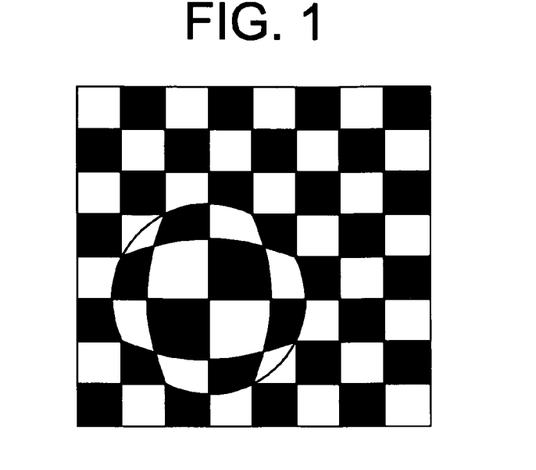
FIG. 1, described previously, illustrates a method, known to the thesis mentioned above, for enlarging a circular portion in a map represented in diagram form by a checkerboard.

FIG. 1 shows a method, known by this thesis, for enlarging a circular portion in a map represented in diagram form by a checkerboard. An enlargement (enlargement value greater than 100%), roughly constant, is applied to the center of the portion to be enlarged, while a reduction (enlargement value lower than 100%), highly nonlinear, is applied to the periphery of the portion to be enlarged. More precisely, this known method involves displaying the so-called peripheral portion, located on the periphery of the portion to be enlarged, by applying respective enlargement ratios with values lower than 100% to certain elements of that peripheral portion, and such that the combination of the display surface of the peripheral portion and the display surface of the portion to be enlarged occupies, in the new image of the map, a surface equal to that of the combination of the display surface of the portion to be enlarged and the display surface of the peripheral portion in the original image of the map.

Figure 2:
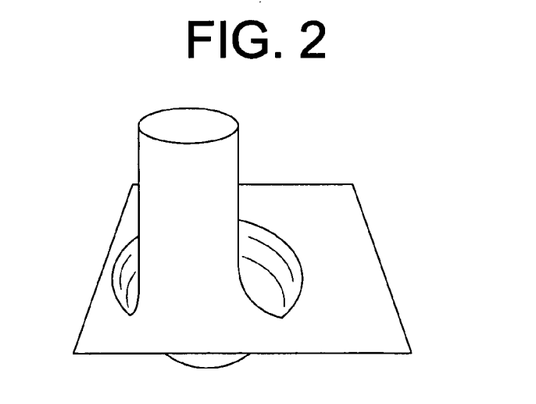
FIG. 2, described previously, shows a perspective view of a grid in which the vertical coordinate of each point represents a value of the enlargement ratio.

FIG. 2 shows a perspective view of a grid in which the vertical coordinate of each point represents an enlargement value used for the example of FIG. 1. A peak can be seen with a flat circular summit, and with a base surrounded by a circular valley. The vertical coordinate of the flat part surrounding this valley represents the initial enlargement (100%) of the map. The vertical coordinate of the flat summit represents the enlargement applied to the enlarged portion of the map. The valley corresponds to enlargement values lower than 100%, in other words achieving a reduction. The vertical coordinate of the bottom of the valley represents the minimum enlargement value, which corresponds to the highest reduction. On the external flank of the valley, the enlargement passes continuously from the initial value (100%) to the minimum value. On the internal flank, the enlargement passes progressively from the minimum value to the initial value (100%) constituting the base of the peak.

Figure 3:
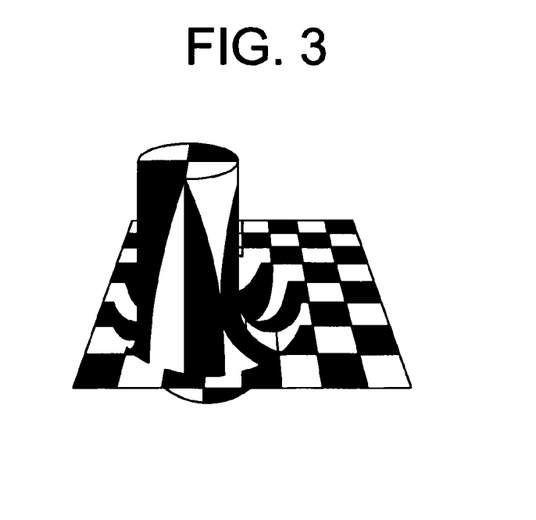
FIG. 3, described previously, shows a perspective view of the same grid, superimposed with a map represented by a checkerboard.

FIG. 3 shows a perspective view of the same grid, superimposed with the map represented in diagram form by a checkerboard.

Figure 4:
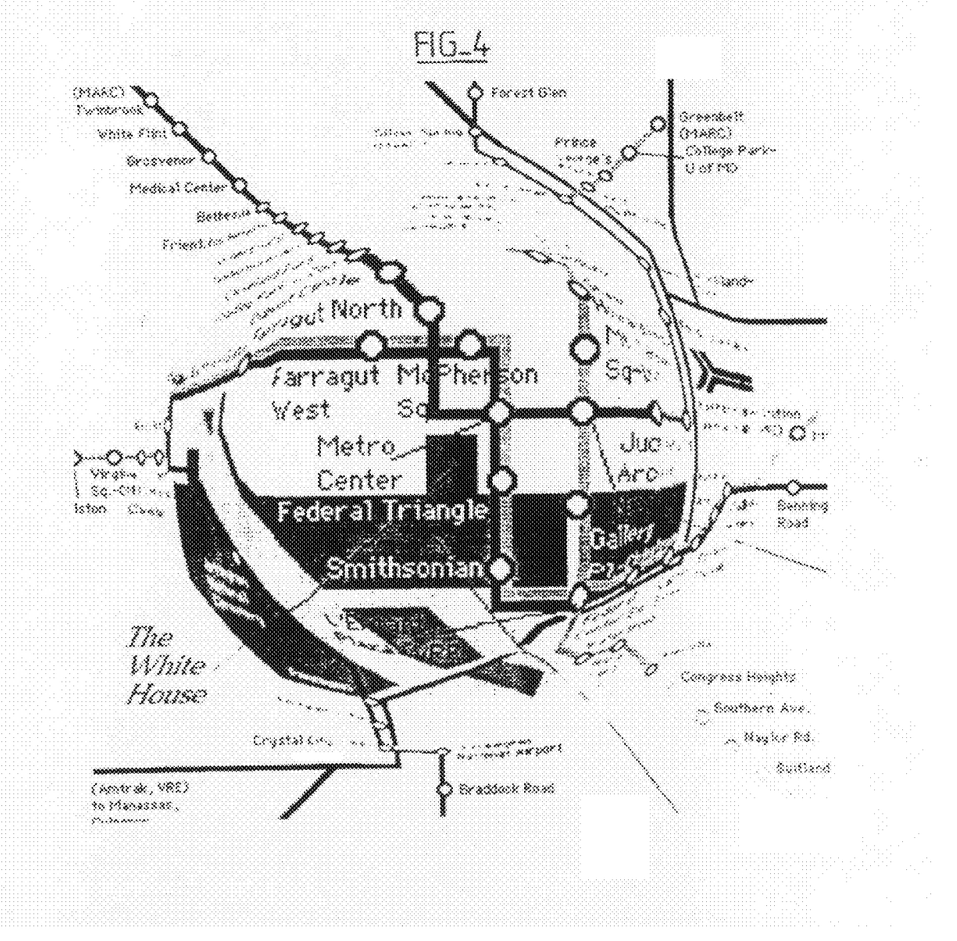
FIG. 4, described previously, shows an actual map, from the Washington subway network, on which such a known method has been applied to enlarge a circular portion located at the center of the map.

FIG. 4 shows an actual map, from the Washington subway network, on which such a known method has been applied to enlarge a circular portion located at the center of the map. The objects located at the periphery of the enlarged portion are reduced. This figure shows that there is no hidden zone, and no discontinuity of the objects represented. A slight blur is applied to the peripheral zone to mark the boundary between the enlarged portion and the non-enlarged portion of the map. It should be noted that, despite the absence of hiding, there is a loss of information in the peripheral zone since the screen and the eye do not have an infinite resolution ability: the subway stations located in the peripheral zone are visible, however their names are not legible due to the distortion and the reduction in the size of the characters.

The document HONGZHI SONG ET AL: "LensList: Browsing and Navigating Long Linear Information Structures HUMAN INTERFACE AND THE MANAGEMENT OF INFORMATION. METHODS, TECHNIQUES AND TOOLS IN INFORMATION DESIGN; [LECTURE NOTES IN COMPUTER SCIENCE], SPRINGER BERLIN HEIDELBERG, BERLIN, HEIDELBERG, vol. 4557, 22 Jul. 2007 (2007 Jul. 22), pages 535-543, XP019064238 ISBN: 978-3-540-73344-7* FIGS. 1-3, pages 537-539* describes a method for displaying a list of words (constituting a menu for example), which provides a magnifying effect on a central portion of this list, without hiding the upper portion or the lower portion of this list, thus guaranteeing the legibility of all the words of the list. It involves enlarging the font of the words in the central portion to be enlarged and reducing the font of the words in the upper portion and in the lower portion. The size of the font increases linearly from the top of the list displayed towards the center of the list displayed, then decreases linearly from the center towards the end of the list displayed. The maximum size and the minimum size are chosen by the user.

A disadvantage of the known methods is that all the objects located in the peripheral portion surrounding the enlarged portion have a reduced size. Choosing the correct enlargement in this peripheral portion can ensure the legibility of all the objects located in this peripheral portion. However, an important object located in the peripheral portion may pass unnoticed since the legibility is reduced. This may be serious if this object is a symbol indicating an alarm, or any other event which may appear unpredictably.

SUMMARY OF THE INVENTION

One aim of the invention is to propose a map display method which simultaneously allows the enlargement of a main portion of a map, without hiding the peripheral portion, and the increased visibility of an object representing an event which appears in this peripheral portion, without hiding the peripheral portion.

The aim of the invention is a map display method allowing the display of a portion of a map to be enlarged, without hiding another portion of this map, comprising the following stages:
  displaying a first portion to be enlarged by applying respective enlargement ratios greater than 100%, with a 100% ratio corresponding to the initial display, to at least some elements of that portion,
  displaying a first peripheral portion located on the periphery of the first portion to be enlarged,
    applying, at least to some elements of that peripheral portion, respective enlargement ratios with values lower than 100% and such that the combination of the display surface of the peripheral portion and the display surface of the portion to be enlarged occupies, in the new image of the map, a surface equal to that of the combination of the display surface of the portion to be enlarged and the display surface of the peripheral portion in the original image of the map;
  choosing the minimum value of the enlargement ratio to be applied to the elements of the peripheral zone so as to leave the essential details of the map visible;
  then determining all of the values of the enlargement ratio to be applied respectively to the elements of the peripheral portion, in such a way that these values are at least equal to the minimum value chosen in this way;
  and determining all of the values of the enlargement ratio, to be applied respectively to the elements of the portion to be enlarged, such that the combination of the display surface of the peripheral portion and the display surface of the portion to be enlarged occupies in the new image a surface equal to that of the combination of the display surface of the portion to be enlarged and the display surface of the peripheral portion in the original image of the map;
characterized in that it further involves:
  detecting an event which appears in said first peripheral portion, and then:
  defining a second portion to be enlarged, centered on the position of this event,
  defining a second peripheral zone associated with this second portion to be enlarged,
  displaying the second portion to be enlarged by applying respective enlargement ratios greater than 100% to at least some elements of that portion, so as to make the event more legible,
  and displaying the second peripheral portion by applying respective enlargement ratios lower than 100% to at least some elements of that portion, determining the enlargement ratios to be applied respectively to the elements which make up the combination of the surfaces displaying the first and the second peripheral portion, through stages involving:

selecting the minimum value of the enlargement ratio to be applied to the elements of the combination of the surfaces displaying the first and the second peripheral portion;

then determining all of the values of the enlargement ratio to be applied respectively to the elements of the combination of surfaces displaying the first and second peripheral portion, in such a way that these values are at least equal to the minimum value chosen in this way;

and determining all of the values of the enlargement ratio to be applied respectively to the elements of the first and the second portion to be enlarged, in such a way that the combination of the surfaces displaying the first and the second peripheral portion, of the surface displaying the first portion to be enlarged, and of the surface displaying the second portion to be enlarged, occupies in the new image a surface equal to that of the combination of the first portion to be enlarged, the second portion to be enlarged, the first peripheral portion and the second peripheral portion, in the original image of the map.

The method characterized in this way provides both a magnifying effect on the main portion, and a magnifying effect on at least one small object which is located in the peripheral portion, without hiding any of the map, since it displays the second peripheral portion by applying, at least to certain elements of this portion, respective enlargement ratios lower than 100% so as to save surface area to avoid hiding a portion of the map.

For example, if the map shows a telecommunication network with small symbols appearing to indicate alarms, a user can easily read the symbols of the alarms which appear in the peripheral zone, without hiding any of the map.

The invention also has the objective of providing a programmable device comprising storage means on which a program is saved, said program comprising instructions which, when run by a computer, carry out the stages of the method according to the invention.

The invention also has the objective of providing storage means on which a program is saved comprising instructions which, when run on a programmable device, carry out the stages of the method according to the invention.

BRIEF DESCRIPTION OF THE DRAWINGS

The invention will be better understood and other characteristics will appear with the help of the description below and the accompanying figures.

DETAILED DESCRIPTION OF THE INVENTION

Figure 5:
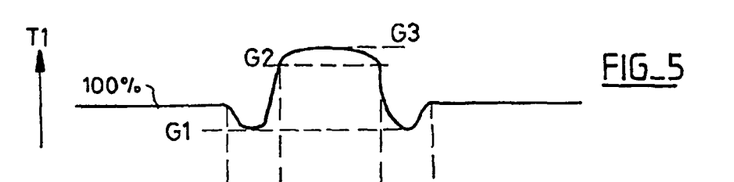
FIG. 5 shows the enlargement ratio graph in a first example of the implementation of a method to enlarge a portion of a map.
Figure 6:
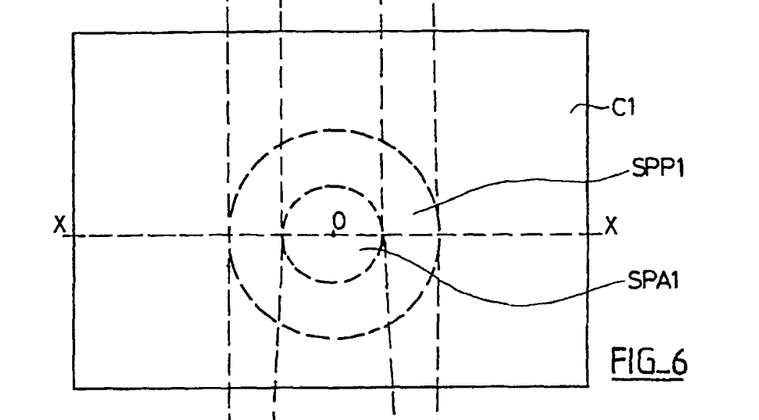
FIG. 6 shows in diagram form the original image of a map, for this first example.
Figure 7:
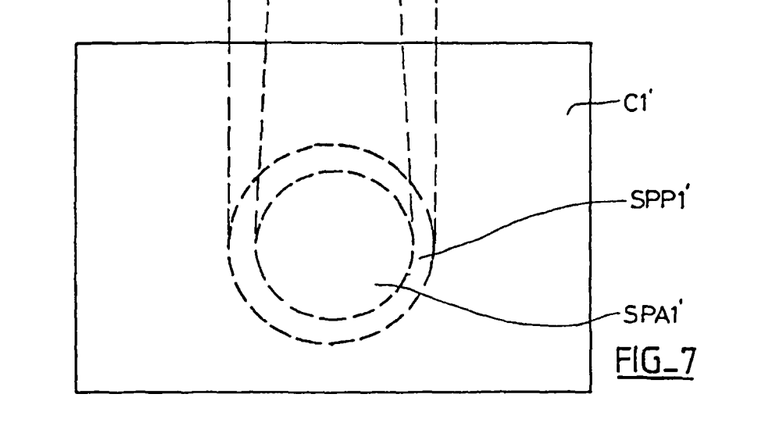
FIG. 7 shows in diagram form the locally enlarged image of this same map, for this first example.

A first example of the implementation of a method for enlarging a portion of a map is illustrated by FIGS. 5 to 7. FIG. 6 shows in diagram form the original image C1 of a map, on a computer screen. A user wishes to locally enlarge this image, by enlarging a portion, said to be the portion to be enlarged, which occupies a surface SPA1 in the original image C1.

FIG. 5 shows the graph of the enlargement ratio T1 in different portions of the original image C1. The image elements concerned for this graph are located on a straight line XX passing through the center O of the surface SPA1 of the portion to be enlarged. In this example, the graph would be the same for any other straight line passing through the center O.

FIG. 7 shows in diagram form the image C1' obtained by locally enlarging the image C1. The portion to be enlarged is enlarged by displaying it, in the new image C1', over a surface SPA1' larger than the surface SPA1. The elements of this portion to be enlarged are enlarged with respective enlargement ratios which are all greater than a value G2, greater than 100%, with a ratio of 100% corresponding to the original display. The ratio passes via a maximum G3 to the center of the portion to be enlarged.

In order to allow the display of this surface SPA1' without hiding another portion of the image, a so-called peripheral zone, SPP1, located on the periphery of the surface SPA1 of the portion to be enlarged in the original image C1 is displayed over a surface SPP1', in the new image C1', such that the combination of the surface SPP1' and the surface SPA1' occupies, in the new image C1', a surface equal to that of the combination of the surface SPA1 and the surface SPP1 in the original image Cl1.

To avoid any discontinuity in the visual effect, the enlargement ratio along the line XX varies continuously from a ratio of 100%, applied to the elements of the peripheral portion SPP1 which are furthest from the portion to be enlarged SPA1, until the ratio G2 applied to the elements of the portion to be enlarged SPA1, which are at the boundary with the peripheral portion SPP1, passing via values lower than 100%, in particular a minimum value G1.

This minimum value G1 is chosen so that a user can still read certain important items represented on the map, for example symbols indicating alarms; then all of the other values of the enlargement ratio to be applied respectively to the elements of the peripheral zone SPP1 are determined such that:

the combination of the surface SPP1' and the surface SPA1' occupies, in the new image C1', a surface equal to that of the combination of the surface SPA1 and the surface SPP1 in the original image C1;

and that the ratio varies continuously from the ratio of 100% to a ratio G2 applied to an element of the portion to be enlarged SPA1 which is at the boundary with the peripheral portion SPP1, passing via a single extremum which is said minimum value G1.

Either the user chooses the respective sizes of the surfaces SPP1 and SPA1, and then the choice of the minimum value G1 imposes the maximum value G3 for the enlargement ratio in the portion to be enlarged.

Or the user chooses the maximum value G3 for the portion to be enlarged, and then the choice of the value G1 imposes the maximum sizes of the surfaces SPP1 and SPA1.

Figure 8:
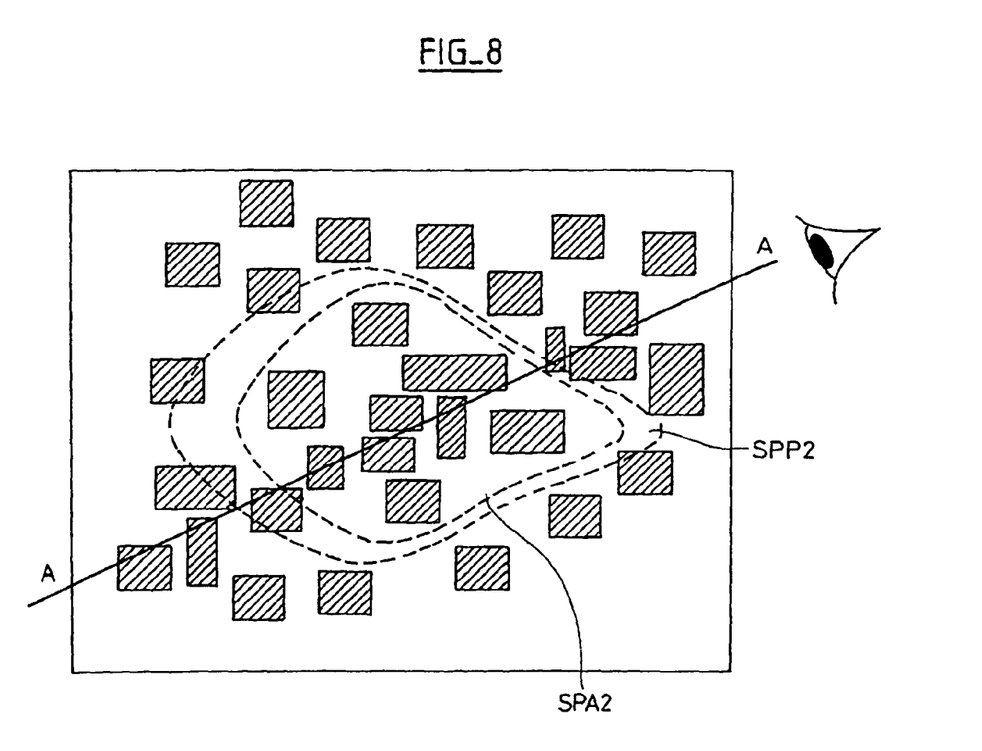
FIG. 8 shows in diagram form the original image of a second map, to illustrate a second example of the implementation of a method to enlarge a portion of a map.

FIG. 8 shows in diagram form the original image of a second map, for a second example of the implementation of a method to enlarge a portion of a map. On this map, buildings are represented, seen from above, by rectangles. A portion to be enlarged which occupies a surface SPA2, and a peripheral portion which occupies a surface SPP2 are considered in the original image. These two portions have a compact shape but which is not circular, to cover the zone of most interest for a user. This user has selected the portion to be enlarged, using a pointing device such as a mouse.

Figure 9:
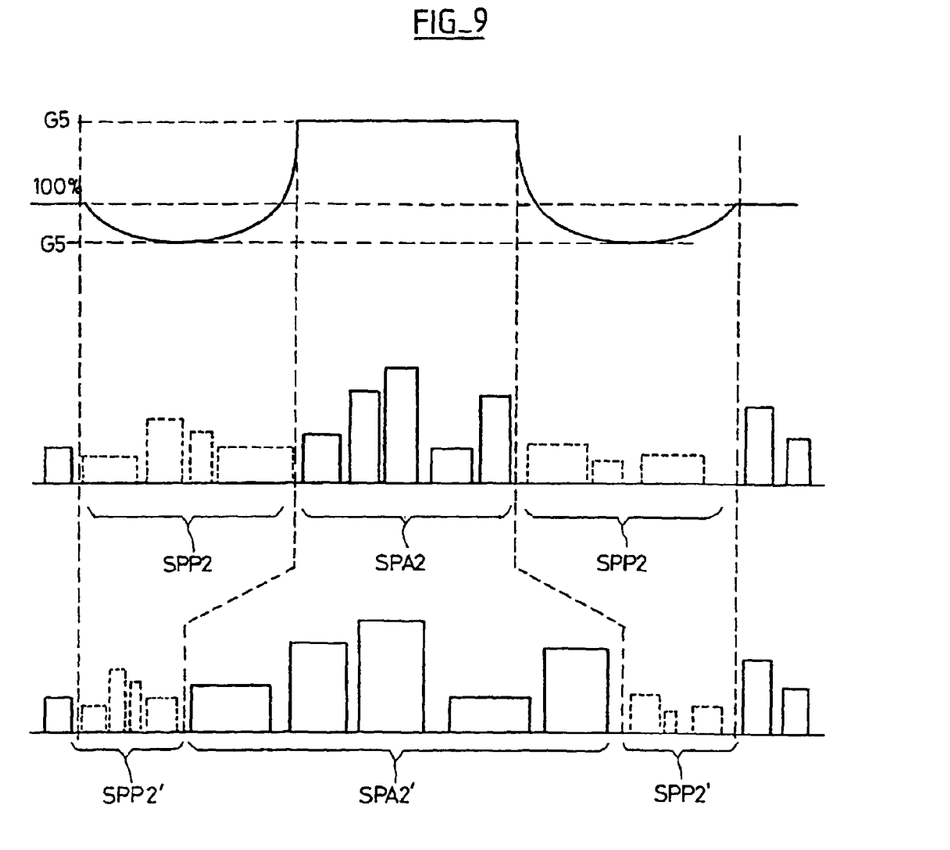
FIG. 9 shows the enlargement ratio graph in this second example, and illustrates the visual effect obtained.

FIG. 9 shows the enlargement ratio graph in this second example, and illustrates the visual effect obtained. The upper portion of the figure represents the enlargement ratio graph for the elements, from the original image, located along a straight line AA passing approximately via the center of the surface SPA2 of the portion to be enlarged. The enlargement ratio along the line AA varies continuously from a ratio of 100%, applied to the elements located outside the portion to be enlarged SPA2 and outside the peripheral portion SPP2, up to a maximum value G5 applied uniformly to all elements of the portion to be enlarged SPA2, passing via a minimum value G4.

This minimum value G4 is chosen so that a user can still read certain objects shown in the surface SPP2' which represents the peripheral portion SPP2, for example symbols indicating alarms. Then all of the other values of the enlargement ratio to be applied respectively to the elements of the peripheral zone SPP2 are determined such that:

the ratio varies continuously from the ratio of 100% up to the ratio G5 passing via a single extremum which is said minimum value G4;

and that the combination of the surface SPP2' representing the peripheral portion and the surface SPA2' representing the portion to be enlarged occupies, in the new image, a surface equal to that of the combination of the surface SPA2 and the surface SPP2 in the original image.

The center line represents a front view, in diagram form, of the buildings located in the surface SPA2 of the portion to be enlarged, and the buildings located in the surface SPP2 of the peripheral portion, of the original image. In these two surfaces, the buildings are visible with the same size since they are all displayed with the same enlargement ratio of 100%.

The lower line represents a front view, in diagram form, of the buildings located in the surface SPA2' of the portion to be enlarged, and the buildings located in the surface SPP2' of the peripheral portion, in the new image. In the surface SPP2' the buildings are displayed with a smaller size than in the surface SPA2', but it can be noted that all the buildings are visible, none are hidden due to the surface SPA2' being larger than SPA2.

Figure 10:
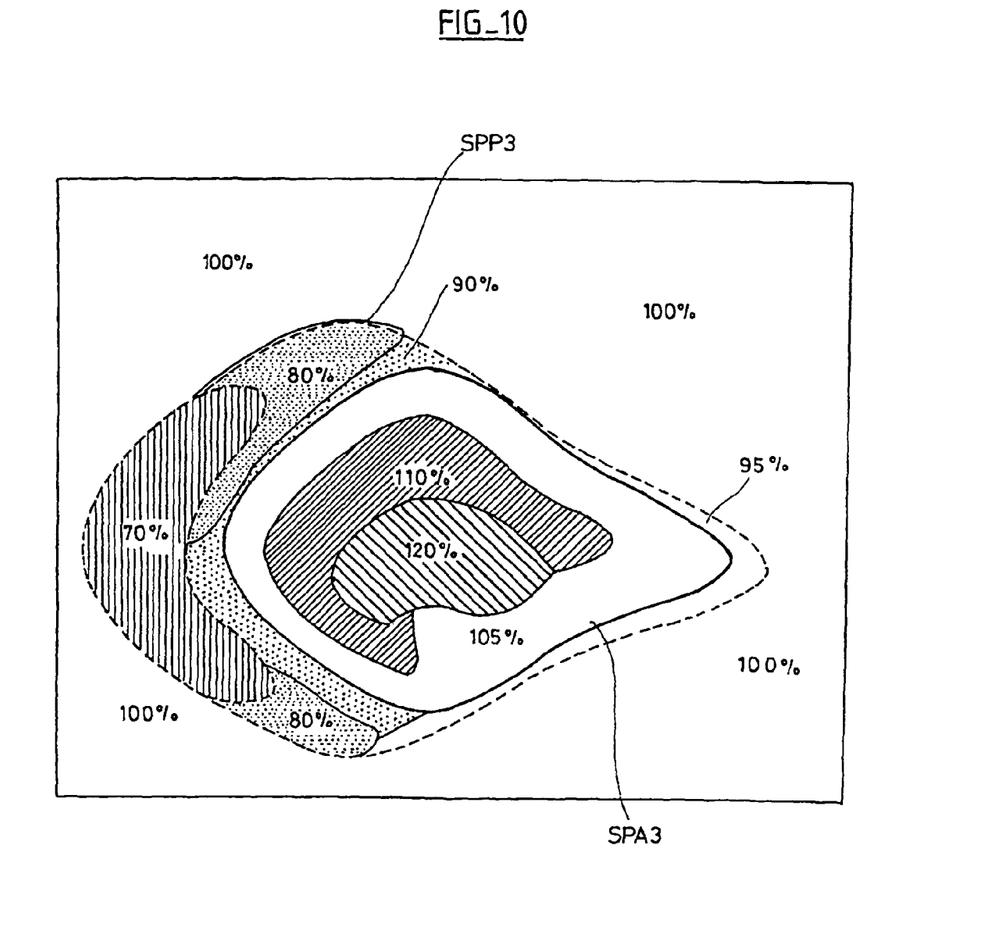
FIG. 10 shows in diagram form the locally enlarged image of this second map, for this second example, indicating the values of the enlargement ratio, chosen for various zones of a portion to be enlarged and various zones of a peripheral portion.

FIG. 10 shows a variant of the implementation of this method for enlarging a portion of a map. It involves breaking down a portion to be enlarged SPA3 into a plurality of zones with different enlargement ratios, 105%, 110%, 120%, and also breaking down a peripheral portion SPP3 into a plurality of zones with different enlargement ratios, 70%, 80%, 90%, 95%. The values of the enlargement ratio, respectively for the various zones, are chosen by a user based on the interest of each zone.

This minimum value (70%) in the peripheral portion SPP3 is chosen so that a user can still read certain objects shown on the map, for example symbols indicating alarms. After this minimum value is chosen, the other values are chosen such that the combination of the display surface SPP3 of the peripheral portion and the display surface SPA3 of the portion to be enlarged occupies, in the new image, a surface equal to that of the combination of the display surface of the portion to be enlarged and the display surface of the peripheral portion, in the original image of the map.

Figure 11:
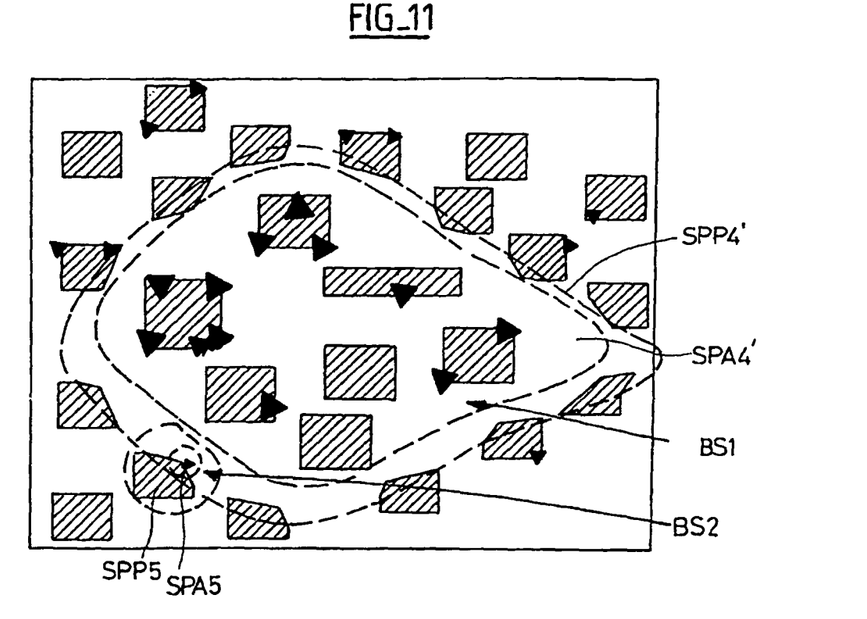
FIG. 11 shows in diagram form the locally enlarged image of a third map, for a first example of the implementation of the method according to the invention, where there is additional local enlargement controlled dynamically by an event.

FIG. 11 shows in diagram form the locally enlarged image of a third map. It illustrates a third example of the implementation of this method for enlarging a portion of a map. According to this variant, there is an additional local enlargement controlled dynamically by an event. This map represents buildings using rectangles, and the base stations of a mobile telephony network using triangles.

A first portion to be enlarged (not shown) is displayed over a surface SPA4' with an enlargement ratio greater than 100%. A first peripheral portion (not shown) is displayed over a surface SPP4'. The first portion to be enlarged has been limited by a user to cover a zone where there is a high density of base stations. The triangle representing the station BS1 is indicated on this figure by way of example. An alarm in a base station is indicated by a change of color or a flashing of the corresponding triangle.

The triangles which symbolize the base stations are displayed with a larger size in the enlarged portion SPA4' than in the non-enlarged portion. However, the triangles are displayed with a smaller size in the peripheral portion SPP4' than in the non-enlarged portion, since the enlargement ratio there is lower than 100% for most of the image elements. To improve the visibility of the alarms in the peripheral portion, it is planned to detect each "Alarm" event in said peripheral portion SPP4', and then automatically define:

a second portion to be enlarged SPA5, of a small size, and centered on the position of this event, the base station BS2 in this example;

and a second peripheral zone SPP5 surrounding this second portion to be enlarged SPA5, and where the enlargement ratio is reduced so as to avoid hiding a portion of the map. This second peripheral zone SPP5 is defined avoiding encroaching on the surface SPA4' which displays the first portion to be enlarged, so as not to cause a reduction in this portion which is of particular interest to the user.

Figure 12:
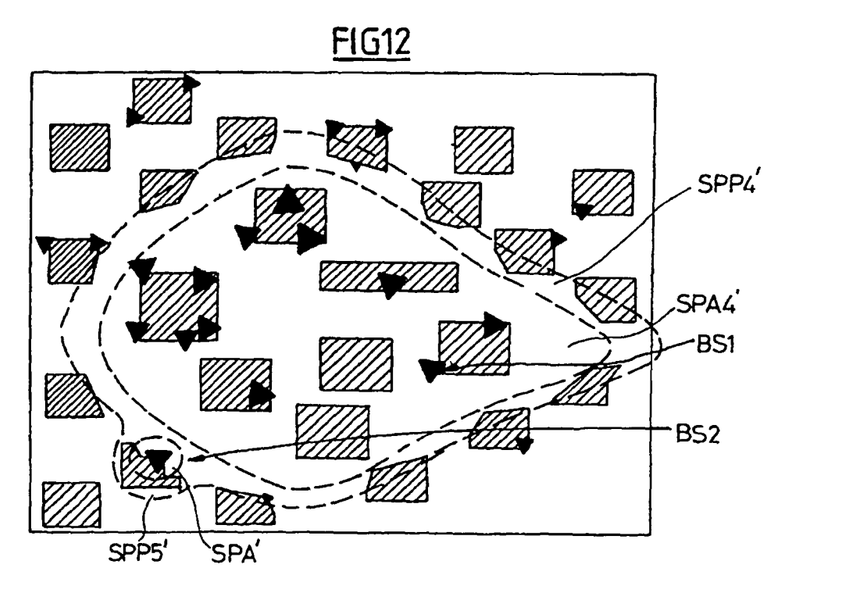
FIG. 12 illustrates the visual effect obtained in this first example of the implementation of the method according to the invention.

FIG. 12 represents the new image obtained in this third example. This third implementation example involves:

displaying over a surface SPA5' the second portion to be enlarged SPA5, displaying the elements of this portion with respective enlargement ratios greater than 100%, preferably with the same ratio as for the first enlarged portion SPA4', so that the base station BS2 is then displayed with the same size as the base station BS1 which is in the first enlarged portion SPA4';

and displaying over a surface SPP5' the second peripheral portion SPP5, displaying the elements of this portion with respective enlargement ratios such that no portion of the map is hidden.

The surface SPP5' and the surface SPP4' have common elements. They are then connected so as to form a single surface SPP4'-SPP5' where the values of the enlargement ratio are lower than 100%, and are smoothed to avoid any discontinuities. The enlargement ratios are recalculated for all elements which make up the combination of the surfaces SPP5' and SPP4' according to the stages involving:

choosing the minimum value of the enlargement ratio to be applied to the elements of this surface SPP4'-SPP5', so that all the important elements of the map remain legible;

then determining all of the values of the enlargement ratio to be applied respectively to the elements of this surface SPP4'-SPP5', in such a way that these values are at least equal to the minimum value chosen in this way;

and determining all of the values of the enlargement ratio to be applied respectively to the elements of the first and the second portion to be enlarged, in such a way that the combination of the surface SPP4'-SPP5', the surface SPA4' and the surface SPA5' occupies in the new image a surface equal to that of the combination of the first portion to be enlarged, the second portion to be enlarged SPA5, the first peripheral portion and the second peripheral portion SPP5, in the original image of the map.

Figure 13:
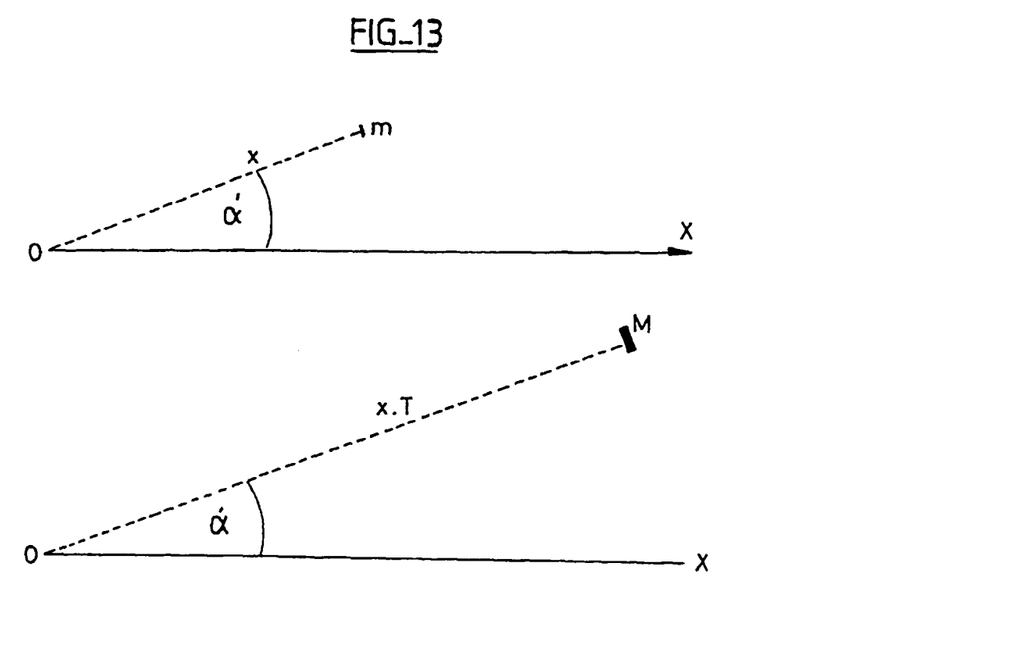
FIG. 13 shows an example of an enlargement method for the implementation of the method according to the invention.

FIG. 13 shows an example of an enlargement method which may be used for the implementation of the method according to the invention. Each point m of an image is identified by two polar coordinates: an angle $\acute{\alpha}$ in relation to a reference axis OX, and a distance x in relation to a reference point O. The enlargement for all points located at the distance x from the reference point O is noted T(x).

In practice, an image element is not a point but rather a small surface with an elementary angular width dd. After applying the enlargement T(x), the point m is represented by a point M which is located at the distance x. T(x), and which still has the angular position a, and which still has the same elementary angular width d$\acute{\alpha}$ seen from the reference point O. The surface occupied by this point is multiplied by $T(x)^2$.

To avoid hiding, the method employed involves determining all of the values of the enlargement ratio, to be applied respectively to the elements of the portion to be enlarged, such that the combination of the display surface of the peripheral portion and the display surface of the portion to be enlarged occupies in the new image a surface equal to that of the combination of the display surface of the portion to be enlarged and the display surface of the peripheral portion in the original image of the map.

In this example, the surfaces are calculated by integrating elementary surfaces along a radius starting from the reference point O.

Figure 14:
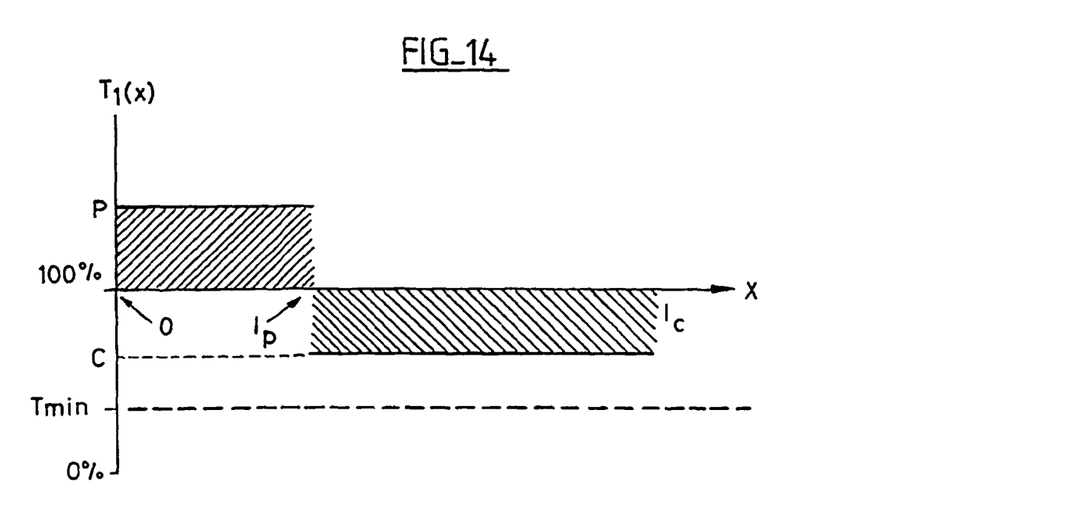
FIG. 14 shows the graph of a first example of the enlargement function for the implementation of the method according to the invention.

FIG. 14 shows the graph of a first example $T1(x)$ of the enlargement function for the implementation of the method according to the invention. The abscissa represents the distance x of an image point in relation to the reference point O, and the ordinate represents the enlargement $T1(x)$.

In this very simple example, the enlargement $T1(x)$ has a constant value P (greater than 100%) for the portion to be enlarged (distance x=0 to Ip) and a constant value C (lower than 100%) for the peripheral portion (distance x=Ip to Ic), the value C being chosen at least equal to the pre-determined minimum value Tmin so that all the important details remain visible.

Before using the zoom, the enlargement was 100% for all the points and in particular between the abscissas 0 and Ic.

The surface of the map is retained if the increase of the surface occupied to represent the abscissa points lower than Ip is equal to the reduction in the surface occupied to represent the abscissa points between Ip and Ic.

For each radius with the angular position $\acute{\alpha}$ (from 0 to 360 degrees) we therefore have:

$$\int_0^{Ip} (P-100) \cdot dx = \int_{Ip}^{Ic} (100-C) dx$$

Hence, the constants P and C must be chosen such that:

$(P-100) \cdot Ip = (100-C) \cdot (Ic-Ip)$

Figure 15:
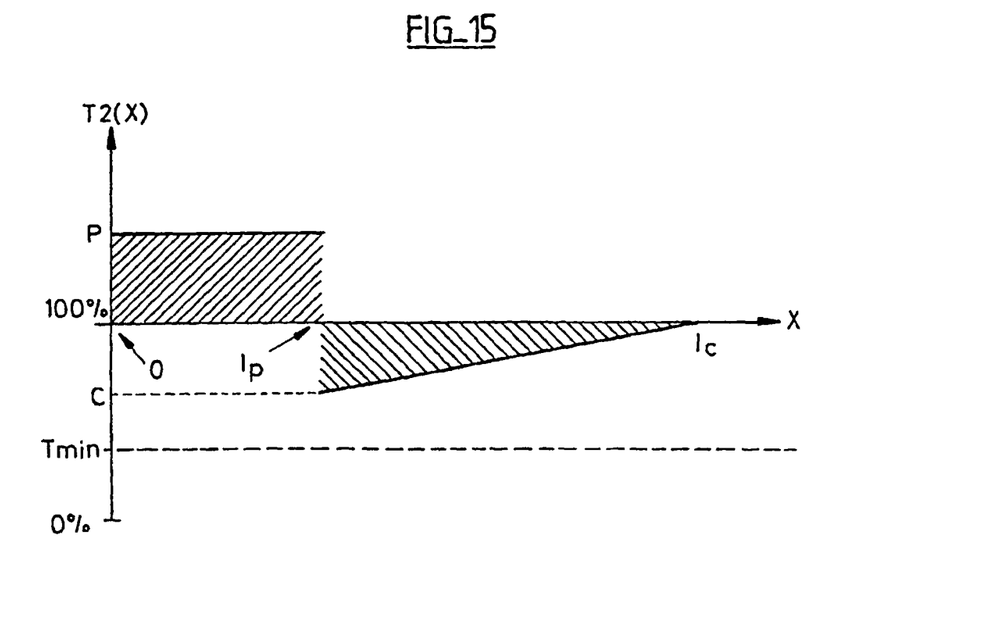
FIG. 15 shows the graph of a second example of the enlargement function for the implementation of the method according to the invention.

FIG. 15 shows the graph of a second example of the enlargement function $T2(x)$ for the implementation of the method according to the invention. In this example, the enlargement $T2(x)$ has a constant value P (greater than 100%) for the portion to be enlarged (distance x=0 to Ip) and a value varying linearly from C (lower than 100%) to 100% for the peripheral portion (distance x=Ip to Ic), the value C being chosen at least equal to the pre-determined minimum value Tmin so that all the important details remain visible.

$$T2(x) = \frac{100-C}{Ic-Ip}(x-Ip) + C$$

Before using the zoom, the enlargement was 100% for all the points and in particular between the abscissas 0 and Ic.

The surface of the map is retained if the increase of the surface occupied to represent the abscissa points lower than Ip is equal to the reduction in the surface occupied to represent the abscissa points between Ip and Ic.

For each radius with the angular position $\acute{\alpha}$ (from 0 to 360 degrees) we therefore have:

$$\int_0^{Ip} (P-100) \cdot dx = \int_{Ip}^{Ic} \left[100 - \left(\frac{100-C}{Ic-Ip}(x-Ip) - C\right)\right] \cdot dx$$

Hence, the constants P and C must be chosen such that:

$$P \cdot Ip - 100 \cdot Ip = \frac{1}{2} \cdot (100-C) \cdot (Ic-Ip)$$

Figure 16:
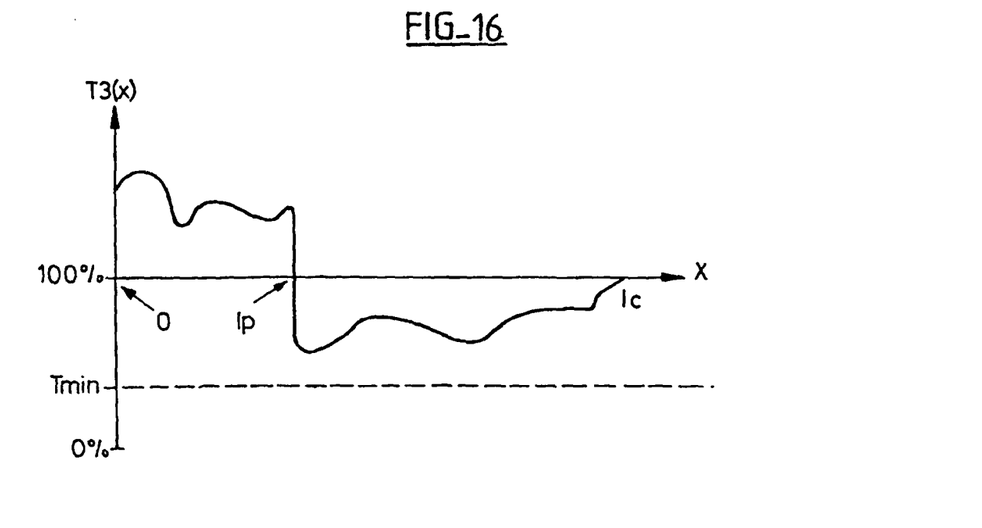
FIG. 16 shows the graph of a third example of the enlargement function for the implementation of the method according to the invention.

FIG. 16 shows the graph of a third example $T3(x)$ of the enlargement function for the implementation of the method according to the invention. In this example, the enlargement $T2(x)$ is a function of any form (but its value remains greater than 100%) for the portion to be enlarged (distance x=0 to Ip) and is another function of any form (but its value remains lower than 100%) for the peripheral portion (distance x=Ip to Ic), the minimum value being chosen at least equal to the pre-determined minimum value Tmin so that all the important details remain visible.

Before using the zoom, the enlargement was 100% for all the points and in particular between the abscissas 0 and Ic.

The surface of the map is retained if the increase of the surface occupied to represent the abscissa points lower than Ip is equal to the reduction in the surface occupied to represent the abscissa points between Ip and Ic.

For each radius with the angular position $\overset{\rightharpoonup}{\alpha}$ (from 0 to 360 degrees) we therefore need:

$$\int_0^{Ip} (T3(x) - 100) \cdot dx = \int_{Ip}^{Ic} (100 - T3(x)) \cdot dx$$

The function $T3(x)$ is therefore chosen for each radius with an angular position $\overset{\rightharpoonup}{\alpha}$, such that this condition is met. It is perfectly possible to choose a slightly different $T3(x)$ function for each value of $\overset{\rightharpoonup}{\alpha}$, so long as this condition is met for each value of $\overset{\rightharpoonup}{\alpha}$.

The invention claimed is:

1. A map display method allowing the display of a portion of a map to be enlarged, without hiding another portion of this map, comprising:
    displaying a first portion to be enlarged by applying respective enlargement ratios greater than 100%, with a 100% ratio corresponding to the initial display, to at least some elements of the first portion,
    displaying a first peripheral portion located on the periphery of the first portion to be enlarged,
    applying, at least to some elements of the first peripheral portion, respective enlargement ratios with values lower than 100% such that a combination of a display surface of the first peripheral portion and a display surface of the first portion to be enlarged occupies, in a new image of the map, a surface equal to a combination of the display surface of the first portion to be enlarged and the display surface of the first peripheral portion in an original image of the map;
    choosing a minimum value of the enlargement ratios to be applied to elements of at least one essential zone so as to leave essential details of the map visible;
    determining all of the values of the enlargement ratios to be applied respectively to the at least some elements of the first peripheral portion, in such a way that the applied values are at least equal to the minimum value;
    determining all of the values of the enlargement ratios, to be applied respectively to the at least some elements of the first portion to be enlarged, such that the combination of the display surface of the first peripheral portion and the display surface of the first portion to be enlarged occupies, in the new image a surface equal to a combination of the display surface of the first portion to be enlarged and the display surface of the first peripheral portion in the original image of the map;
    detecting an event which appears in said first peripheral portion;
    defining a second portion to be enlarged, the second portion being centered on a position of the detected event;
    defining a second peripheral zone associated with the second portion to be enlarged;
    displaying the second portion to be enlarged by applying respective enlargement ratios greater than 100% to at least some elements of the second portion, so as to make the event more legible;
    displaying the second peripheral portion by applying respective enlargement ratios lower than 100% to at least some elements of the second peripheral portion;
    determining the enlargement ratios to be applied respectively to the elements which make up the combination of the surfaces displaying the first peripheral portion and the second peripheral portion, through,
        selecting the minimum value of the enlargement ratios to be applied to the at least some elements of a combination of the surfaces displaying the first peripheral portion and the second peripheral portion,
        determining all of the values of the enlargement ratios to be applied respectively to the at least some elements of the combination of the surfaces displaying the first peripheral portion and the second peripheral portion such that all of the values are at least equal to the minimum value; and
        determining all the values of the enlargement ratios to be applied respectively to the at least some elements of the first portion and the second portion to be enlarged such that the combination of the surfaces displaying the first peripheral portion and the second peripheral portion, of the surface displaying the first portion to be enlarged, and of the surface displaying the second portion to be enlarged, occupies in the new image a surface equal to a combination of the first portion to be enlarged, the second portion to be enlarged, the first peripheral portion and the second peripheral portion, in the original image of the map.

2. The map display method according to claim 1, wherein the determining of all of the values of the enlargement ratios to be applied respectively to the at least some elements of at least one of the first portion and the second portion includes breaking down the at least one of the first portion and the second portion into a plurality of zones with different enlargement ratios.

3. The map display method according to claim 1, wherein the determining of all of the values of the enlargement ratios to be applied respectively to the at least some elements of the first peripheral portion and the second peripheral portion includes breaking down the first peripheral portion and the second peripheral portion into a plurality of zones with different enlargement ratios.

4. The map display method according to claim 1, wherein the displaying the first peripheral portion and the second peripheral portion displays the at least some elements of the first portion and the second portion with respective enlargement ratios varying continuously from a ratio of 100%, applied to the at least some elements of the first peripheral portion and the second peripheral portion, which are furthest from the respective one of the first portion and the second portion to be enlarged, until a ratio applied to one of the at least some elements of the respective one of the first portion and the second portion to be enlarged, which is at the boundary with the respective one of the first peripheral portion and the second peripheral portion, passing via values of lower than 100%, such that the combination of the display surface of the respective one of the first peripheral portion and the second peripheral portion and of the display surface of the respective one of the first portion and the second portion to be enlarged occupies, in the new image of the map, a surface equal to that of the combination of the display surface of the first portion and the second portion to be enlarged and of the display surface of the first peripheral portion and the second peripheral portion in the original image of the map.

5. A non-transitory computer-readable medium including a computer program product, the computer program product comprising instructions which, when executed by a processor, causes the processor to carry out the method according to claim 1.

6. A non-transitory computer-readable medium including a computer program product, the computer program product comprising instructions which, when executed by a processor, cause the processor to carry out the method according to claim 4.

\* \* \* \* \*